Sept. 1, 1964  E. SMITH  3,147,194
NUCLEAR REACTOR FUEL ELEMENTS

Filed March 2, 1961  2 Sheets-Sheet 2

INVENTOR
Ernest Smith

BY
Larson and Taylor

United States Patent Office 3,147,194
Patented Sept. 1, 1964

3,147,194
NUCLEAR REACTOR FUEL ELEMENTS
Ernest Smith, Warrington, England, assignor to United Kingdom Atomic Energy Authority, London, England
Filed Mar. 2, 1961, Ser. No. 92,934
Claims priority, application Great Britain Mar. 2, 1960
2 Claims. (Cl. 176—77)

This invention relates to nuclear fuel elements and is concerned with nuclear fuel elements of elongate form having ends equipped to allow a series of fuel elements to be stacked end to end upon one another in a vertical fuel element channel of a nuclear reactor.

It has been found that, when stacked in a vertical fuel element channel with the support at the base and cooled by a flow of coolant passed up the channel, such fuel elements can suffer from vibration due to the flow of coolant.

Known fuel elements are equipped with radial supports of "spider" form or with longitudinal splitter fins for centering purposes. However, to facilitate charging and discharging of the fuel elements, such supports have to be given clearance with the walls of the fuel element channel, and thus, when within the channel, the supports do not extend fully to the walls of the channel and hence are not effective in restraining the fuel elements against vibration.

It is, therefore, an object of the invention to provide means for restraining fuel elements against vibration in their channels.

The present invention resides in a nuclear reactor fuel element of elongate form having a plurality of projecting support members attached to one end of the element, the effective radial length of at least one of said members being adjustable.

The invention also resides in an end attachment for a fuel element, the attachment having support members as aforesaid and in a stacked column of nuclear reactor fuel elements in a fuel element channel of a gas-cooled nuclear reactor, each fuel element having a plurality of projecting support members attached to one end of the element and the effective radial length of at least one of said members being adjustable so that said members make contact with the wall of the channel and exert on said wall a lateral thrust derived from the weight of a superior fuel element.

Figure 1:
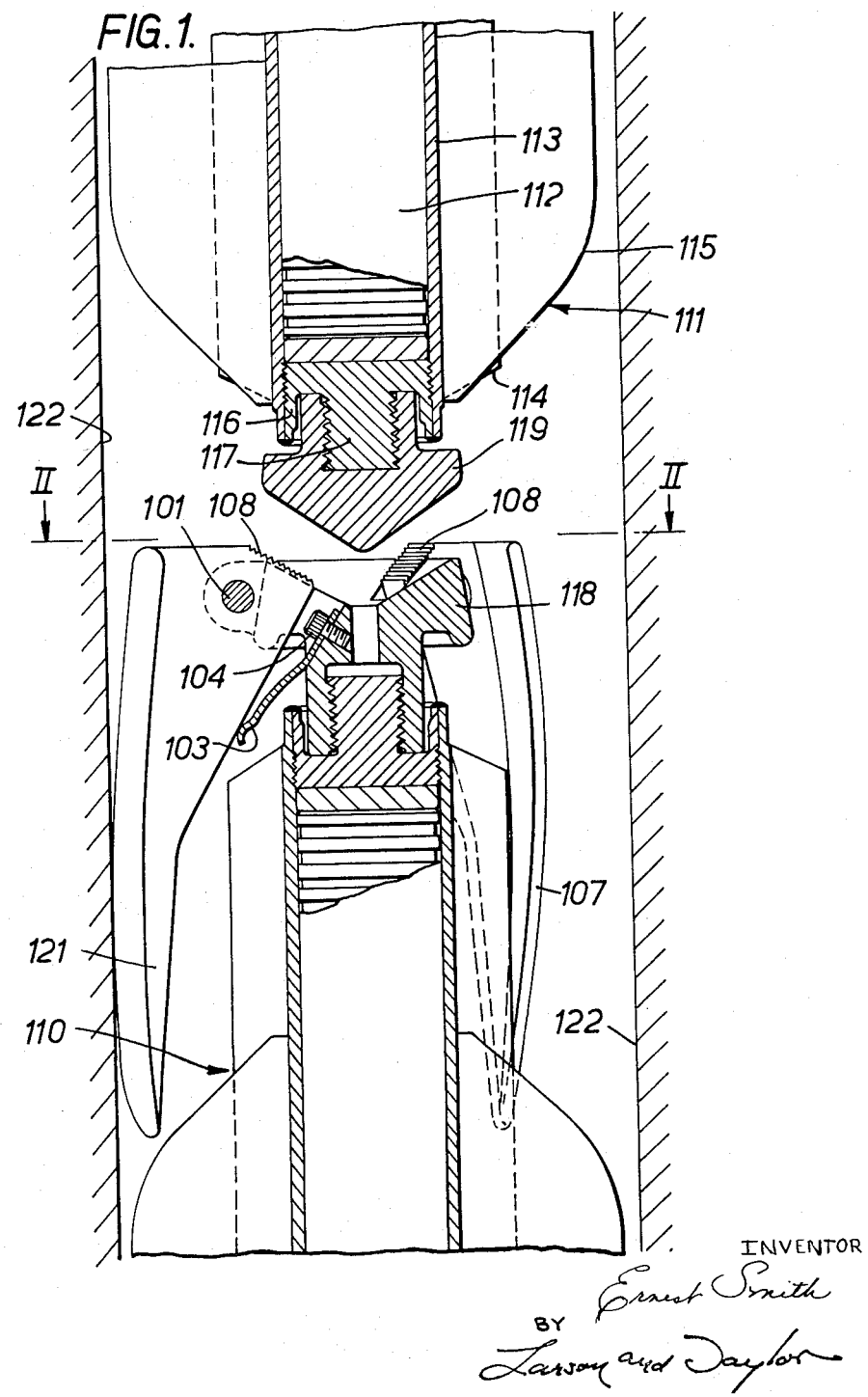
Figure 2:
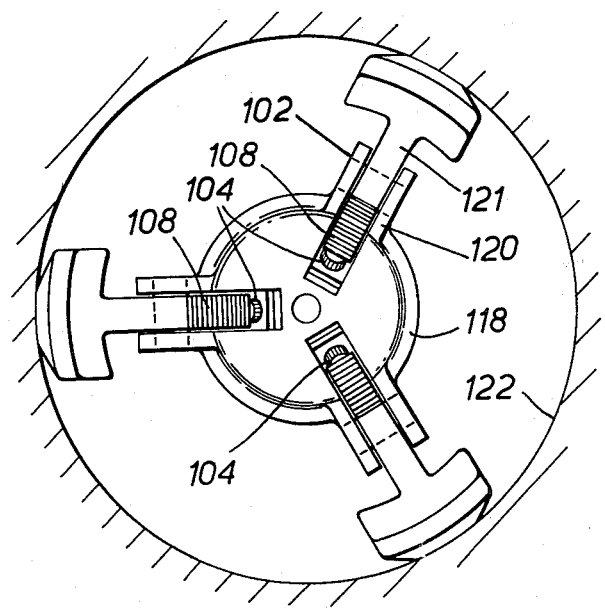

An embodiment of the invention will now be described by way of example with reference to the accompanying drawings, wherein:

FIGURE 1 is a side view in medial section and FIGURE 2 is a plan view of FIGURE 1.

In the drawings is shown the upper end of a nuclear reactor fuel element 110 and the lower end of a nuclear reactor fuel element 111 located in a channel 122. The elements 110, 111 are identical and each comprises a nuclear fuel member 112 in a protective sheath 113 provided with longitudinal fins 114 and baffles 115. The sheaths 113 are closed by end caps 116 which are welded to the sheaths 113 and carry screw-threaded spigots 17 to which are attached end-locating members 118, 119 respectively. The member 119 is cone-shaped and fits in the cup-shaped member 118. The member 118 is provided with three equispaced forks 120. Between each fork 120 fits an arm 121 which pivots on a pin 101 passing through a hole 102 in the fork 120. Each arm 121 is provided with a shoe 107 and a serrated edge 108. A leaf spring 103, held by a screw 104 threaded into the end-locating member 118, urges each arm 121 outwards so that when a fuel element to which the member 118 is attached is stacked in the fuel element channel 122 the shoes 107 contact the wall of the channel and stabilise the element. The springs 103 are only required to stabilise the element during charging of the next fuel element in the stack. The cone-shaped end locating member 119 at lower end of each fuel element engages the serrated edges 108 of the arms 121 and maintains the shoes 107 in contact with the wall of the channel 122 irrespective of the springs 103, exerting a lateral thrust on the wall.

The element 111 is shown in the drawing being lowered into position on top of the element 110. During charging of a fuel element the arms 121 may be restrained by the charging grab against the action of the springs 103 or the shoes 107 may be shaped so that they slide along the channel 122.

It is not essential for all the support members (arms 121) to be increasable in effective radial length but is is an advantage as the fuel elements are then located centrally in the fuel element channel.

I claim:

1. A nuclear reactor fuel element of elongate form for use in a vertical stack in a nuclear reactor fuel element channel with similar fuel elements, the fuel element including a plurality of projecting support members each of which are pivotably mounted on a fixed pivot at the periphery of the upper end of the fuel element, each said support member comprising a generally downwardly extending arm movable by the pivoting radially outwardly from the fuel element to an extended position and thereby increasing the effective radius of the fuel element, the support member further comprising means defining an edge integral with the arm and extending inwardly of the fuel element from the pivot, the edge means being engageable by a superior fuel element and responsive to the weight of the superior fuel element for a downward pivotal movement thereof to thereby pivot the arm radially outwardly to the extended position; and resilient leaf spring means urging each one of the arms toward the extended position, the leaf spring means being fixed at one end thereof to the upper end of the fuel element, and the other end thereof being in contact with the said arm.

2. A nuclear reactor fuel element according to claim 1 wherein the edge means is serrated.

References Cited in the file of this patent

UNITED STATES PATENTS

| 2,949,415 | Stubbs et al. | Aug. 16, 1960 |
| 2,983,662 | Shillitto et al. | May 9, 1961 |

UNITED STATES PATENTS

| 213,799 | Australia | Mar. 6, 1958 |
| 563,703 | Belgium | July 3, 1958 |
| 1,063,290 | Germany | Aug. 13, 1959 |
| 875,462 | Great Britain | Aug. 23, 1961 |